Nov. 28, 1967  E. E. FRENCH  3,354,929
TIRE TRUING MACHINES
Filed July 16, 1965  3 Sheets-Sheet 1
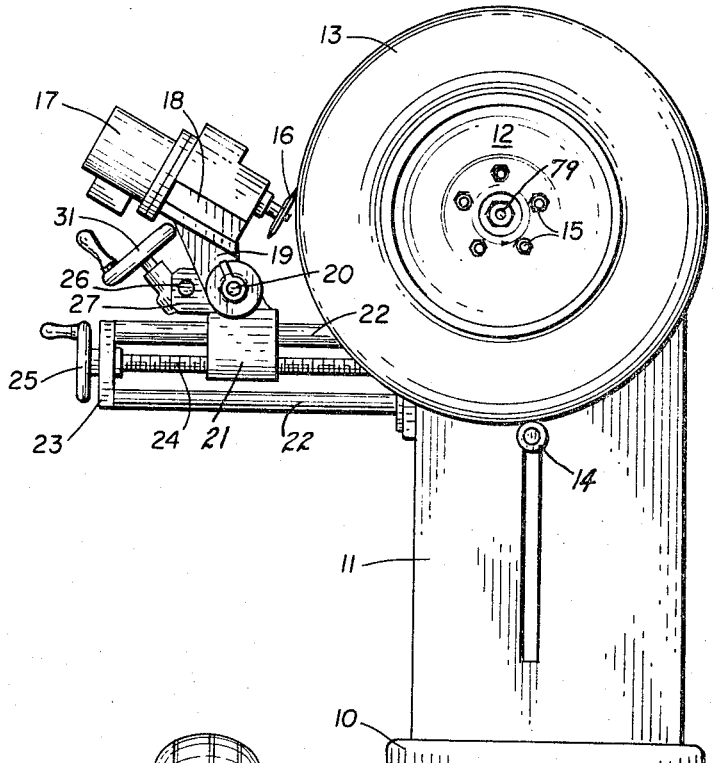
Fig_1
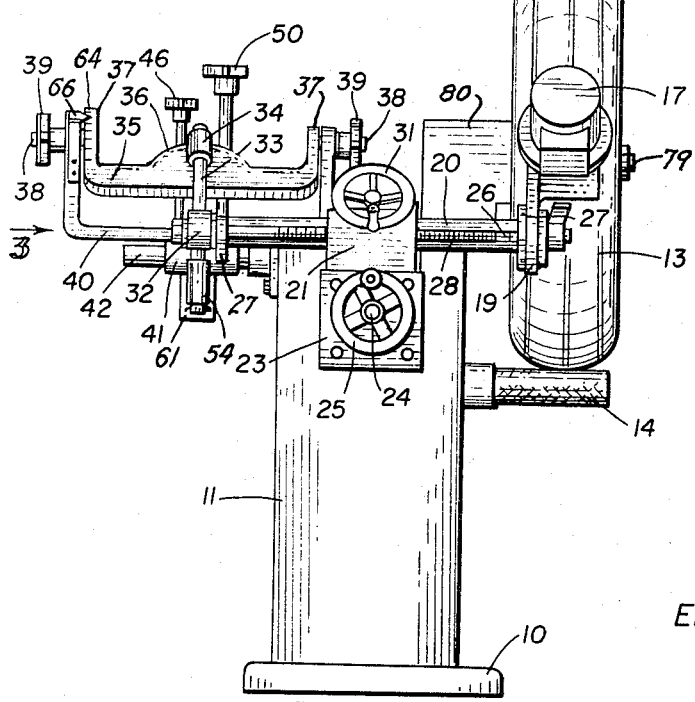
Fig_2
INVENTOR.
ELBY EDWARD FRENCH
BY
ATTORNEY Nov. 28, 1967  E. E. FRENCH  3,354,929
TIRE TRUING MACHINES
Filed July 16, 1965

INVENTOR.
ELBY EDWARD FRENCH
BY
*RHGalbreath*
ATTORNEY

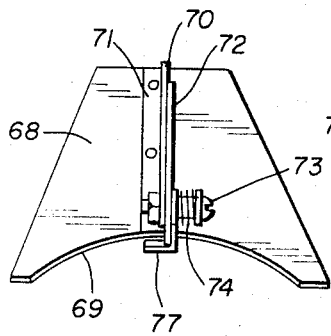
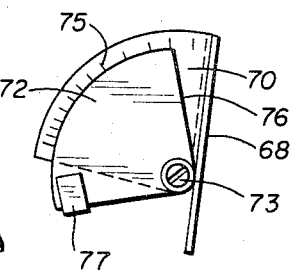
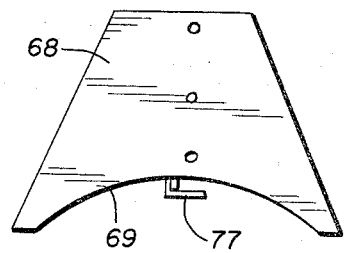
Fig-6     Fig-7     Fig-8
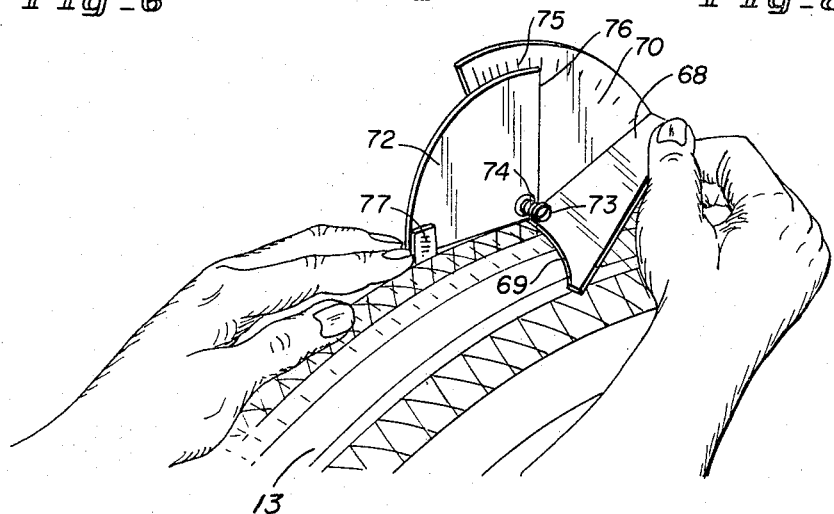
Fig-9
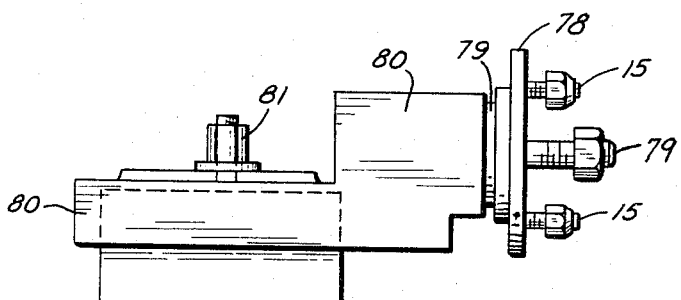
Fig-10
INVENTOR.
ELBY EDWARD FRENCH
BY
ATTORNEY

United States Patent Office 3,354,929
Patented Nov. 28, 1967

3,354,929
TIRE TRUING MACHINES
Elby Edward French, Littleton, Colo., assignor to O. K. Tire and Rubber Co., Littleton, Colo., a corporation of Colorado
Filed July 16, 1965, Ser. No. 472,589
7 Claims. (Cl. 157—13)

ABSTRACT OF THE DISCLOSURE

The specification discloses a tire truing machine with cutting means mounted on a movable follower shaft to follow a preset pivotable template surface.

A calibrated radius gauge may be adjusted on the tire tread to calibrate the transverse curvature of the tire. The machine is provided with a single pivoted template with similar calibration characteristics to adjust the transverse curvature that will be reproduced on the tire to be trued.

This single pivoted template can be quickly, easily, and accurately adjusted to produce any desired transverse curvatures for all sizes and types of tires.

---

This invention relates to a tire truing machine and has for its principal object the provision of means for quickly, efficiently and accurately bringing the treads of out-of-round, pneumatic vehicle tires to a true, smooth, uniform and concentric circumference throughout the entire tread width so as to reduce vibration and increase the efficiency and roadability of the tires.

Another object of the invention is to provide means for truing tires in accordance with an accurate guide template or pattern so that all of the tires will have accurate, uniform, cross-sectional contours.

A further object is to provide means for presetting or adjusting the pattern or template without interchange thereof, so that the truing machine will accurately reflect any desired transverse, tread curvature.

A still further object is to provide a calibrated radius gauge which can be placed upon the tread of a tire to be trued, and manully adjusted to calibrate the transverse curvature or tread radius of the tire so that the truing machine may be quickly preset in accord with the calibration of the radius gauge to automatically reproduce the calibrated transverse curvature upon the tire to be trued.

Other objects and advantages reside in the detail construction of the invention, which is designed for simplicity, economy, and efficiency. These will become more apparent from the following description.

In the following detailed description of the invention, reference is made to the accompnying drawing which forms a part hereof. Like numerals refer to like parts in all views of the drawing and throughout the description.

In the drawing:

FIG. 1 is a left side, elevational view of the tire truing machine of this invention showing a tire in place thereon;

FIG. 2 is a front elevational view thereof;

FIG. 6 is a front elevational view of a calibrated radius gauge of a type designed for use in presetting the template of FIG. 5;

FIG. 7 is a side elevational view of the radius gauge of FIG. 6;

FIG. 8 is a rear elevational view of the radius gauge;

FIG. 9 is a fragmentary, perspective view illustrating how the radius gauge of FIG. 7 is applied to a conventional tire tread to obtain an index reading of the transverse radius of the tread; and FIG. 10 is a fragmentary front elevational view of the upper extremity of a pedestal employed for supporting the tire truing mechanism of this invention.

Figure 3:
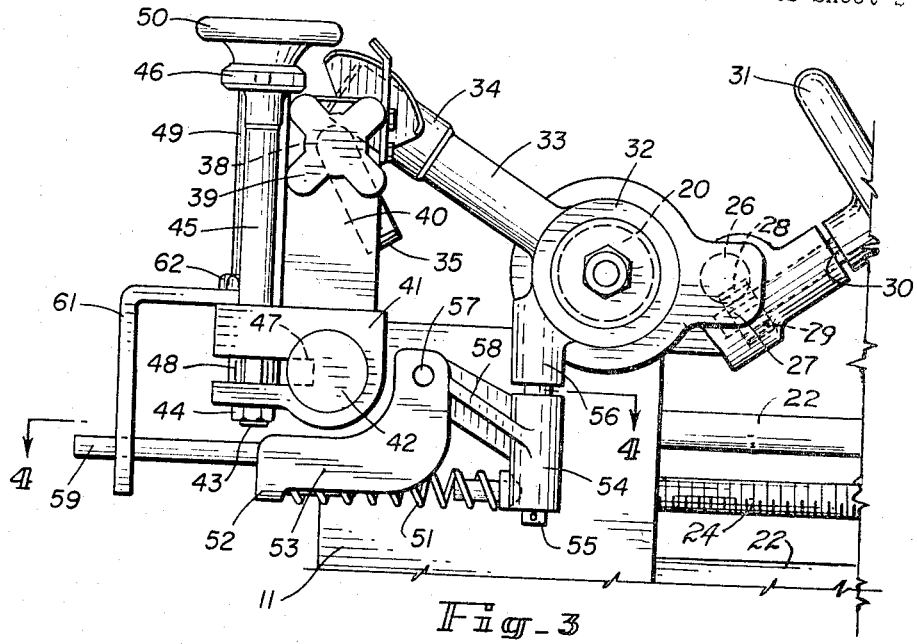
FIG. 3 is an enlarged, fragmentary, right side elevational view looking in the direction of the arrow "3" in FIG. 2.
Figure 4:
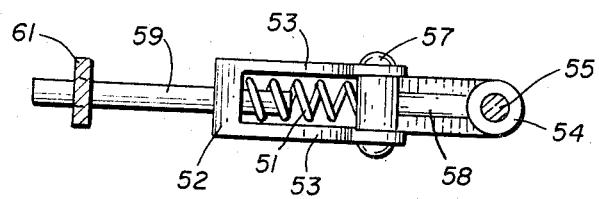
FIG. 4 is a similarly enlarged, detail, sectional view looking downwardly on the line 4—4, FIG. 3.

The invention is applicable to any type of tire truing machine in which a cutting means is passed transversally of the tread of an inflated, wheel-mounted, rotating tire tread in accordance with the dictates of a pattern or template, such as the machine illustrated and described in prior Patent No. 2,601,810.

Such a machine is illustrated on the accompanying drawings mounted on a base 10 from which a hollow supporting pedestal 11 arises to support an automotive wheel 12 upon which a tire to be trued, indicated at 13, is mounted. The axle of the wheel, indicated at 79, is rotatably mounted in a shiftable pedestal cap 80, see FIG. 10, which can be shifted horizontally on the top of the pedestal 11 and locked in any desired position by means of a clamp nut 81.

The wheel 12 may be rotated in any desired manner. As illustrated, the tire 13 is frictionally engaged by a knurled, friction, drive roller 14 which is forced upwardly against the tire 13 and rotated by any suitable power device within the hollow pedestal 11. The wheel is mounted on an axle flange 78 formed on the freely rotatable wheel axle 79 by means of conventional wheel lug bolts 15.

The tread of the tire is trued by means of a flat, circular, cutting disc 16 having a sharpened circumferential edge, the plane of which is positioned at an effective cutting tangent to the tread of the tire 13. The disc 16 is driven from a suitable disc drive motor 17 mounted on a gear box 18 containing a conventional set of reduction gears. The gear box 18 is fixedly mounted, through the medium of a gear box bracket 19, on the left extremity of a horizontal, template follower shaft 20.

The template follower shaft 20 passes through and is slidably supported, intermediate its extremities, in a crosshead 21 which is slidably supported on guideways 22 in a table assembly 23 secured to and projecting horizontally forward from the pedestal 11 at right angles to the axis of the wheel axle 79. The crosshead 21 can be adjusted toward or away from the wheel axis, along the guideways 22 in any desired manner such as by means of a threaded feed screw 24 which is rotatably mounted on the table assembly 23 and provided with a convenient feed wheel 25.

A rack rod 26 is connected, at its extremities, to the template follower shaft 20, by means of end plates 27. The rack rod 26 and the follower shaft 20 both pass and move through the crosshead 21 in relatively close parallel relation. The rack rod is fixed against rotation in the end plates 27. The follower shaft 20 is fixed against axial movement in the end plates 27 but is free to rotate in the latter. Thus, the follower shaft may be shifted laterally of the machine by shifting the rack rod laterally in the crosshead 21. The shifting may be accomplished in any desired manner. As illustrated, the rack rod is provided with a toothed rack 28 which is engaged by a toothed pinion 29 in the crosshead. The pinion 29 is mounted on a pinion shaft 30 provided with a shift wheel 31 rotation of which moves the template follower shaft 20 longitudinally or horizontally back and forth to cause the cutting disc 16 to travel laterally of the tread of the tire 13.

A template follower element 32 is fixedly mounted on the extremity of the template follower shaft 20 distant from the gear box bracket 19 so as to rotate in unison with the latter. A roller arm 33 projects rearwardly and upwardly from the template follower element 32 upon which an elongated, tubular follower roller 34 is rotatably mounted to contact the upper edge of an elongated, adjustable, tread-radius template 35.

Figure 5:
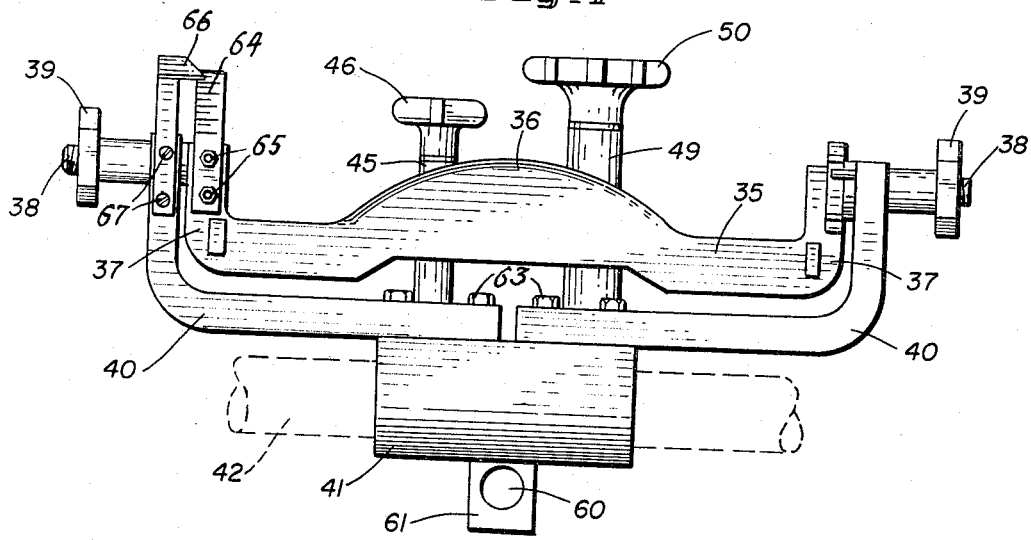
FIG. 5 is a detail front view of a guide template, and its supporting means, as employed upon this improved machine.

The tread-radius template is shown more in detail in FIG. 5 and comprises a relatively long, flat, U-shaped, metallic plate having an upwardly arched medial portion 36 and two upwardly extending terminal legs 37 from each of which a threaded pivot stud 38 horizontally extends. The pivot studs are in axial alignment with each other and in substantially horizontal alignment with the high point of the arched medial portion 36 of the template. The upper edge of the medial portion 36 is transversally rounded so that the roller 34 will tangentially-contact the edge at any incline of the template.

The template is adjustably supported in a two-part, U-shaped yoke 40, the pivot studs 38 being rotatably mounted in the up-turned extremities of the yoke and being provided with hand-clamp nuts 39 by means of which the template may be locked at any desired vertical angle in the yoke. The two parts of the yoke 40 are mounted upon a split clamp block 41 by means of suitable cap screws 63. The clamp block 41 surrounds a fixed stub shaft 42 which is bolted at one extremity to, and extends horizontally outward from, the left side of the pedestal 11 parallel with, and rearwardly of, the template follower shaft 20. The split in the clamp block 41 can be urged closed to grip the stub shaft 42, so as to maintain the block in any desired position along the stub shaft, by means of a clamp bolt 43 and nut 44. The clamp bolt 43 extends upwardly through a spacing tube 45 and is threaded into an elevated hand-grip nut 46 positioned within convenient reach of the operator.

The clamp block 41 can be moved along the stub shaft 42 in any desired manner. As illustrated, a toothed rack 47 is longitudinally inset in the stub shaft 42 and meshed with a pinion 48 mounted on a vertical pinion shaft which extends upwardly through a vertical bearing sleeve 49 and terminates in a hand-grip wheel 50 also within reach of the operator.

The roller 34 is resiliently urged into contact with the upper edge of the template 35 by means of a spring assembly including a compression spring 51 which is compressed between the bight 52 of a U-shaped yoke member 53 and a spring sleeve 54. The spring sleeve 54 is rotatably mounted on a pivot stud 55 extending downwardly from a stud boss 56 formed on the template follower element 32 and the two sides of the yoke member 53 are pivotally suspended, as indicated at 57, from a bracket arm 58 formed on and extending rearwardly from the spring sleeve 54. A spring-aligning stem 59 is mounted on and extends rearwardly from the bight 52 of the yoke member 53 through a countersunk opening 60 in a downwardly-extending leg 61 of an angle bracket which is bolted to and extends downwardly from the split clamp block 41, as shown at 62. Since the leg 61 of the angle bracket is always positioned below the middle of the template, due to its mounting on the clamp block 41, and since the forward extremity of the spring 51 is always positioned below the roller arm 33 and roller 34, due to the mounting of the template follower element 32, the thrust of the spring will always direct the roller toward a medial position on the template so that the reaction of the spring will always be balanced so as to avoid side-thrust along the template.

In use, the cutting disc 16 is aligned with the center line of the tire and the roller 34 is aligned with the medial portion 36 of the template by shifting either or both the pedestal cap 80 or the clamp block 41. Although the clamp block adjustment is sufficient to accommodate the many sizes of tires, it may not be sufficient to accommodate a commercial tire mounted on a wheel with several inches of "dish." The "dish" of a wheel is defined as the offset between the mounting hub and the tire center. Large commercial tires may have an offset or dish of several inches and the added adjustability of pedestal cap 80 enables the operator to adjust the machine to all sizes and types of mounted tires. The feed wheel 25 is then adjusted to bring the cutting disc into contact with the lowest point, or point of least radius, of an out-of-round tire while the roller 34 is at the midpoint of the template. The wheel 12 is now rotated in a counter-clockwise direction and rotation is imparted to the cutting disc 16 and the shift wheel 31 is rotated to cause the roller 34 to travel lengthwise of the template 35. It can be seen that the cutting disc will then trim the tire tread circumferentially to a perfect circumference having a radius equal to the radius of the "lowest point" and will also trim the tread laterally to a transverse curvature corresponding to the arc of contact between the template 35 and the roller 34.

In prior devices, the pattern plates or templates were interchangeable to produce various transverse curvatures to correspond to different sizes and types of tires. In this invention, only one template is used which remains in place at all times and which can be quickly, accurately and easily adjusted to produce any desired radius of transverse curvature on the tread being trued.

The transverse radius adjustment is accomplished by simply tilting the template forward or back. For instance, let us assume that the medial portion 36 of the template has a radius of 4″ and that the template is inclined forwardly to a position at 90° to the axis of the roller 34. Movement of the roller along the template will now cause the cutting disc to cut a transversally circular path across the tread of the tire corresponding to the 4″ circular radius of the medial portion 36. Now let us assume that the template is tilted rearwardly to a position parallel to the axis of the roller. The roller will now travel in a straight line as it is moved along the side of the flat template and the cutting disc will travel in a straight line across the tire tread. Thus, the radius of the transverse cut can be preset to any radius from the radius of the medial portion 36, assumed 4″, to infinity by simply tilting the template 35 on the pivot studs 38 and locking it in the preset position by the hand-clamp nuts 39.

The amount of tilt can be read upon an arcuate index scale 64 secured to one of the terminal legs 37 by means of attachment screws 65. A stationary pointer 66, secured to the adjacent up-turned leg of the U-shaped yoke 40 by means of suitable attachment screws 67, overlaps the scale 64 to indicate positions on the latter. Thus, the template can be quickly set up for the radius index number of any given tire. If the index number of a tire is not known in advance, it may be quickly determined by means of tre radius gauge shown in FIGS. 6-9.

The radius gauge comprises a radius plate 68, the bottom edge of which is arcuately indented upwardly, as shown at 69, on a radius substantially corresponding to the radius of the medial portion 36 of the template 35. An arcuately triangular gauge plate 70 is attached to the middle of the front face of the radius plate 68, such as by means of an edge flange 71 attached thereto, and extends forwardly at right angles to the radius plate. An arcuately triangular indicator plate 72 is pivotally mounted on the gauge plate 70 upon a pivot bolt 73 provided with a compression spring 74 which constantly urges the plates 70 and 72 together in frictional engagement. The hypotenuse edges of both plates 70 and 72 are arcuate about the axis of the pivot bolt 73. The arcuate edge of the gauge plate 70 projects beyond the indicator plate 72 to carry a suitable radius index scale 75 upon which positions are indicated by a leading edge 76 on the indicating plate 72. The trailing edge of the indicating plate is provided with an angularly-turned finger-grip 77.

The radius gauge above described is used as shown in FIG. 9. The trailing edge of the indicator plate 72 is positioned in alignment with the center line of the tire tread and is pressed thereagainst by one hand. The radius plate 68 is then gripped in the other hand and tilted forwardly until the arcuate indentation 69 therein fits snugly and completely across the arcuate tread of the tire as shown in FIG. 9. The position of the leading edge 76 on the scale 75 gives the index number which must be set below the pointer 66 on the index scale 64 of the tire truing machine to reproduce the proper transverse radius on the gauged tire.

While a specific form of the invention has been described and illustrated herein, it is to be understood that the same may be varied within the scope of the appending claims, without departing from the spirit of the invention.

Having thus described the invention what is claimed and desired to be secured by Letters Patent is:

1. A radius gauge for determining the transverse radius of a tire tread for use in presetting a tire truing machine comprising: a radius plate the bottom edge of which is arcuately indented upwardly on a predetermined radius; a gauge plate attached medially to the front face of said radius plate and projecting perpendicularly forwardly therefrom; an indicator plate pivotally mounted on said gauge plate; a radius index scale on said gauge plate; and scale indicating means on said indicator plate, said radius plate being adapted to be positioned transversally of said tire tread with the indicating plate resting on said tire in the center plane thereof so that said radius plate may be tilted on said pivot until the arcuately intended bottom edge corresponds to the transverse radius of the tread and the indicating means on said indicator plate designates an index designation on said radius index scale.

2. A machine for truning a tire while mounted on a wheel, comprising;
   (a) a frame;
   (b) means for mounting and rotating said wheel mounted on said frame;
   (c) a follower shaft slidably and rotatably mounted on said frame parallel to the axis of said wheel;
   (d) cutting means mounted on said follower shaft in a spaced relation to the axis of the wheel;
   (e) a template follower mounted on said follower shaft;
   (f) a relatively flat, arcuately contoured template mounted on said frame in the path of said template follower to pivot about an axis parallel to said follower shaft and thereby vary the effect of the template on said template follower;
   whereby, the template follower will travel along said arcuately contoured template to effect rotation of said follower shaft to move said cutting means towards and away from said tire to true the tire in correspondence with the contour of said template.

3. A tire truing machine as described in claim 2 wherein said template has an arcuate medial high point on its contoured surface.

4. A tire truing machine as described in claim 2 having an index scale means mounted on said frame to visibly designate the degree of pivot for said template.

5. A tire truing machine as described in claim 2 in which the template follower comprises an elongated roller of sufficient length to remain in contact with said template through all pivoted positions of said template.

6. A tire truing machine is described in claim 2 in which the template is mounted on said frame by a template supporting means, said means comprising;
   (a) a stationary, horizontal stub shaft mounted on said frame;
   (b) a clamp block mounted on and longitudinally adjustable along said stub shaft;
   (c) a U-shaped yoke mounted on said clamp block, the upturned extremities of which provide the support for the pivoted mounting of said template.

7. A tire truing machine as described in claim 2 wherein said means for mounting said wheel further comprise;
   (a) a shiftable cap mounted on said frame;
   (b) wheel mounting means mounted on said cap; whereby the wheel is shifted simultaneously with said cap.

References Cited

UNITED STATES PATENTS

| | | | |
|---|---|---|---|
| 2,601,810 | 7/1952 | James | 157—13 |
| 2,893,479 | 7/1959 | Sheridan et al. | 157—13 |
| 2,986,205 | 5/1961 | Okerstrom | 157—13 |
| 3,152,632 | 10/1964 | Clapp | 157—13 |

GRANVILLE Y. CUSTER, JR., Primary Examiner.